(12) United States Patent
Mitter et al.

(10) Patent No.: US 9,458,798 B2
(45) Date of Patent: Oct. 4, 2016

(54) METHOD AND DEVICE FOR INJECTING A GASEOUS MEDIUM

(71) Applicant: Robert Bosch GmbH, Stuttgart (DE)

(72) Inventors: Roland Mitter, Gramastetten (AT); Uwe Gordon, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 14/315,442

(22) Filed: Jun. 26, 2014

(65) Prior Publication Data

US 2015/0000641 A1    Jan. 1, 2015

(30) Foreign Application Priority Data

Jun. 26, 2013    (DE) .................. 10 2013 212 191

(51) Int. Cl.
*F02M 21/02*    (2006.01)
*F16K 31/06*    (2006.01)

(52) U.S. Cl.
CPC ....... *F02M 21/0254* (2013.01); *F02M 21/026* (2013.01); *F02M 21/0239* (2013.01); *F02M 21/0248* (2013.01); *F02M 21/0272* (2013.01); *F02M 21/0278* (2013.01); *F16K 31/0655* (2013.01); *Y02T 10/32* (2013.01)

(58) Field of Classification Search
CPC ............. F16K 31/0693; F16K 27/029; F16K 31/0658; F16K 1/221; F16K 1/32; F16K 31/02; F16K 31/402; F16K 31/404; F02M 21/0254; F02M 25/0836; F02M 47/027; F02M 61/12; F02M 61/1806; F02M 2025/0845; F02M 51/061; F02M 59/466; F02M 61/18; F02M 63/0077; F02M 63/0078; F02M 21/0248; F02M 21/0278; Y02T 10/32; Y02T 10/123; F04B 53/1082; F04B 7/0076; F23N 2035/14; F01L 3/20; F01L 3/22; F23K 5/147

USPC ....... 123/476, 478, 458, 445, 462, 538–542; 239/569, 900, 533.12, 585.4, 494, 497, 239/5, 296, 305, 491, 282, 553, 533.11, 239/585.3, 590.3, 552; 251/129.01–129.22, 251/333, 318, 320–323, 325, 3, 26, 328, 251/330, 205–209, 153–155; 138/44, 45

See application file for complete search history.

(56) References Cited

U.S. PATENT DOCUMENTS

| 5,178,332 A * | 1/1993 | Tsukakoshi ........ F02M 51/0639 239/552 |
| 5,564,392 A * | 10/1996 | Oguma ................ F02M 51/061 123/472 |
| 5,899,390 A * | 5/1999 | Arndt ........................ B05B 1/34 239/533.12 |
| 6,170,763 B1 * | 1/2001 | Fuchs .................. F02M 61/162 239/533.11 |

(Continued)

FOREIGN PATENT DOCUMENTS

| CA | 2847547 | 3/2013 |
| DE | 10261610 | 7/2004 |

(Continued)

*Primary Examiner* — Lindsay Low
*Assistant Examiner* — Long T Tran
(74) *Attorney, Agent, or Firm* — Michael Best & Friedrich LLP

(57) ABSTRACT

A method for injecting a gaseous medium, in particular a gaseous fuel, into an intake tract (1) of a gas engine or diesel-gas engine using an electromagnetically actuable gas valve (2). In order to increase the flow speed, the gaseous medium is injected into the intake tract (1) via at least two throttling points (3, 4) positioned in series.

10 Claims, 3 Drawing Sheets

(56) References Cited

U.S. PATENT DOCUMENTS

| | | | |
|---|---|---|---|
| 6,182,943 B1 | 2/2001 | Steinrück et al. | |
| 6,230,991 B1* | 5/2001 | Steinruck | F16K 31/0693 239/585.1 |
| 6,422,488 B1* | 7/2002 | Fochtman | F02M 51/0614 239/585.1 |
| 6,505,112 B1 | 1/2003 | Merminod et al. | |
| 6,695,229 B1* | 2/2004 | Heinbuch | F02M 61/162 239/491 |
| 6,772,965 B2* | 8/2004 | Yildirim | F02M 45/086 239/533.13 |
| 6,921,022 B2* | 7/2005 | Nally | F02M 51/0653 239/5 |
| 8,231,069 B2* | 7/2012 | Matsumura | F02M 61/1853 239/518 |
| 8,342,430 B2* | 1/2013 | Ohno | F02M 51/0646 239/482 |
| 2004/0060538 A1* | 4/2004 | Togashi | F02M 61/1853 123/294 |
| 2005/0284965 A1* | 12/2005 | Schneider | F02M 61/186 239/533.12 |
| 2008/0116301 A1* | 5/2008 | Yasukawa | F02M 61/18 239/533.12 |
| 2010/0247359 A1* | 9/2010 | Hauri | F04B 39/08 417/510 |
| 2012/0152202 A1* | 6/2012 | Kurokawa | F02M 61/186 123/298 |

FOREIGN PATENT DOCUMENTS

| | | |
|---|---|---|
| DE | 102005046433 | 3/2007 |
| EP | 0491404 | 6/1992 |
| WO | 9918345 | 4/1999 |
| WO | 2005040591 | 5/2005 |
| WO | 2009152414 | 12/2009 |

* cited by examiner

METHOD AND DEVICE FOR INJECTING A GASEOUS MEDIUM

BACKGROUND OF THE INVENTION

The invention relates to a method and to a device for injecting a gaseous medium, in particular a gaseous fuel, into the intake tract of a gas engine or diesel-gas engine.

Electromagnetically actuable gas valves for injecting gaseous fuels into an intake tract of an engine are generally known. Such valves may in this case be used in such a way as to be combined to form a central injection unit for supplying gaseous fuel to multiple cylinders of the engine (central gas injection—"CGI"), or a separate gas valve is provided for each cylinder (multipoint injection—"MPI").

A generic gas valve emerges for example from the laid-open specification DE 199 05 721 A1. To provide a large passage cross section while simultaneously realizing short switching and response times, said document proposes a gas valve which is in the form of a flat-seat valve. Said valve has a planar valve seat and a sealing element with at least one planar sealing surface facing toward the valve seat. Said construction is intended to permit valve cross sections of up to 10 mm², it being the intention to be able to realize reliable switching of such valve cross sections with simultaneously short switching times.

A further gas valve, likewise in the form of a flat-seat valve, is also known from WO 2009/152414 A2.

During the injection of a gaseous medium, in particular of a gaseous fuel, into the intake tract of a gas engine or diesel-gas engine, the pressure of the gaseous medium and the opening duration of the valve determine the gas volume that is injected into the intake tract. For volume control, it is for example possible for the energization of an electromagnet, by means of which the gas valve can be actuated, to be varied in order to realize a short or long opening duration, and in order to thus inject a small or large fuel volume.

Since modern engines are often operated under extreme lean conditions ($\lambda>1$), it is particularly important to ensure a homogeneous fuel-air mixture in the cylinder of the engine. The fuel-air mixture is formed in the intake tract between the gas valve and combustion chamber. Here, the length of the flow path from the gas valve to the combustion chamber may be decisive of whether a homogeneous mixture formation, which ensures a uniform combustion of the gas mixture in the combustion chamber, is achieved.

Taking the abovementioned prior art as a starting point, it is the object of the present invention to specify a method and a device for injecting a gaseous medium into an intake tract of an engine, which method and device promote a homogeneous mixture formation in the intake tract.

SUMMARY OF THE INVENTION

The method proposed for injecting a gaseous medium, in particular a gaseous fuel, into an intake tract of a gas engine or diesel-gas engine provides the use of an electromagnetically actuable gas valve. According to the invention, the gaseous medium is injected into the intake tract via at least two throttling points positioned in series. This results in an increase in flow speed, which in turn assists a homogeneous mixture formation in the intake tract.

In the present case, the increase in the flow speed is realized by virtue of the flow cross section being reduced in the region of a throttling point such that the pressure of the gaseous medium falls but the speed increases ("Venturi effect"). The pressure energy is accordingly converted into speed, whereby the mixture formation of the gaseous medium with the air present in the intake tract is improved considerably.

The throttling points are preferably formed by means of the electromagnetically actuable gas valve which is used in the method according to the invention for injecting the gaseous medium into the intake tract. This means that the throttling points are preferably integrated into a flow path of the gas valve. In this way, the gas valve is capable of assisting an optimum mixture formation.

To carry out the method according to the invention, use may for example be made of the device, which is also proposed, for injecting a gaseous medium, which device comprises an electromagnetically actuable gas valve.

In a preferred embodiment of the invention, the flow cross sections of the throttling points are coordinated with one another. Here, the flow cross section $A2$ of a downstream throttling point is smaller than the flow cross section $A1$ of a throttling point situated upstream thereof ($A1/A2>1$). This means that the throttling action in the region of the throttling point situated upstream, and consequently the pressure loss, are lower, such that, when the downstream throttling point is reached, adequate pressure energy is available for converting into speed.

In a refinement of the method, it is proposed that the at least one further, downstream throttling point is used for diverting the flow of the gaseous medium as it is injected into the intake tract. By means of the flow diversion, it is possible—as required—to realize a symmetrical or asymmetrical distribution of the gaseous medium over the cross section of the intake tract.

To achieve the object mentioned in the introduction, there is also proposed a device for injecting a gaseous medium, in particular a gaseous fuel, into an intake tract of a gas engine or diesel-gas engine. The device comprises an electromagnetically actuable gas valve which has a valve plate with at least one throughflow opening that can be opened up or closed off by means of the stroke of a valve disk that can perform a stroke movement. According to the invention, downstream of the throughflow opening, at least one throttling point is integrated into the flow path of the gaseous medium in order to increase the flow speed of the gaseous medium. This is because, as it flows through the throttling point, the pressure of the gaseous medium falls, and the flow speed increases ("Venturi effect"). This in turn has the effect that the mixture formation of the gaseous medium with the air present in the intake tract is improved.

It is preferable for the throttling point to have positioned upstream thereof a further throttling point which is formed, in a manner dependent on the stroke of the valve disk, between the valve disk and the valve plate when the gas valve is in the open position. The gaseous medium accordingly passes through at least two throttling points before passing into the intake tract. Here, the flow cross sections of the throttling points are coordinated with one another such that, upstream of a throttling point that issues directly into the intake tract, there is still adequate pressure available for conversion of the pressure energy into speed.

A flow cross section $A2$ of a downstream throttling point is therefore preferably smaller than the flow cross section $A1$ of a throttling point situated upstream thereof ($A1/A2>1$). This means that the throttling action in the region of the throttling point situated upstream, and consequently the pressure loss, are lower, such that, when the downstream throttling point is reached, adequate pressure energy is available for converting into speed.

Ideally, a distinction is made between two cases with regard to the configuration and coordination of the throttling cross sections:

In the first case, the pressure conditions are subcritical. A throttling action is realized by means of the stroke of the valve disk. Said throttling action should be so weak that a situation of stroke independence exists at the set stroke, such that the throughflow is preferably determined exclusively by way of the further throttling point arranged downstream. In general terms, the following applies: A2<A1.

In the second case, the pressure conditions are supercritical, that is to say the speed of sound is reached. In this case, the throttling points should preferably be coordinated with one another such that the supercritical pressure conditions prevail at the further throttling point arranged downstream. This is because the throughflow is then independent of the back pressure. For this purpose, the further throttling point arranged downstream is preferably configured such that the following applies: A2≤0.8×A1.

With corresponding configuration and coordination of the throttling points, it is possible to realize optimum homogenization of a gas mixture.

In one preferred embodiment of the invention, the valve disk has at least one throughflow opening which is arranged offset with respect to the at least one throughflow opening of the valve plate. Accordingly, during the operation of the device, the gaseous medium flows not only around but also through the valve disk. It is preferable for multiple throughflow openings to be provided in the valve disk, which throughflow openings are furthermore preferably in each case arranged offset with respect to multiple throughflow openings of the valve plate. The surfaces of the valve disk that remain between the multiple throughflow openings may in this case be used as sealing surfaces which, when they come into contact with the valve plate, cause the throughflow openings formed in the valve plate to be closed off. The gas valve may accordingly be formed as a flat-seat valve, wherein that face surface of the valve plate which faces toward the valve disk forms the valve seat.

It is also proposed that the downstream throttling point is a throughflow opening in a plate-shaped component. The plate-shaped component preferably forms a component of the gas valve and is furthermore preferably fixedly connected to a housing part of the gas valve. The plate-shaped component advantageously has multiple, preferably identical throughflow openings which each form throttling points positioned in parallel. The plate-shaped component may for example be at least partially formed as a grate.

It is preferable if the plate-shaped component and the valve plate together delimit a chamber via which the throttling points positioned in series are fluidically connected. The chamber forms a type of pre-chamber in which mixing of the gaseous medium with the air present therein already takes place.

The plate-shaped component may take any desired form. It may for example be of flat, that is to say planar form or may have inclined surfaces. In a preferred refinement of the invention, the plate-shaped component is at least partially of convex or concave form. Alternatively or in addition, it is proposed that at least two throughflow openings of the plate-shaped component have longitudinal axes inclined differently relative to a longitudinal axis A of the gas valve. The longitudinal axes may for example be oriented so as to intersect at a point. Said point may simultaneously be the central point of a pitch circle that describes the convex or concave curvature of the plate-shaped component.

The flow of the gaseous medium can be diverted by virtue of the longitudinal axes of the throughflow openings of the plate-shaped component being inclined differently relative to the longitudinal axis A. Said flow may for example be directed toward a certain part of the cross section of the intake tract in order to achieve an asymmetrical distribution if desired.

An asymmetrical distribution may alternatively or additionally be realized by virtue of the throughflow openings being distributed non-uniformly in the plate-shaped component. This means that the spacings between the throughflow openings may vary. Furthermore, the flow cross sections of the multiple throughflow openings may be selected so as to differ.

If an asymmetrical distribution is not desired, then it is possible, by means of throughflow openings with identical flow cross sections arranged in a uniformly distributed manner, to achieve a symmetrical distribution, which promotes particularly homogeneous mixture formation.

BRIEF DESCRIPTION OF THE DRAWINGS

Preferred embodiments of a device according to the invention will be described in more detail below on the basis of the appended figures, in which.

DETAILED DESCRIPTION

Figure 1:
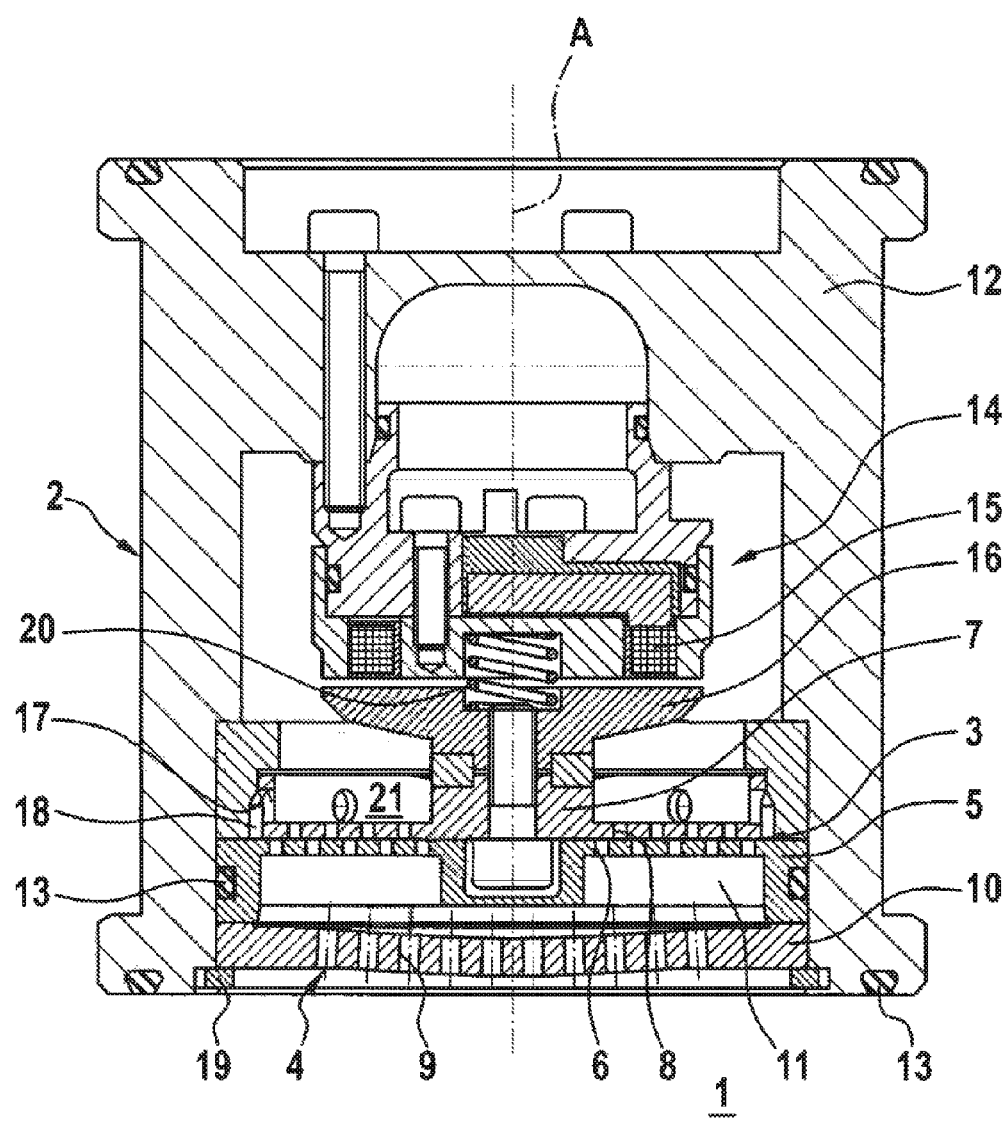
FIG. 1 shows a longitudinal section through a device according to the invention according to a first preferred embodiment.
Figure 2:
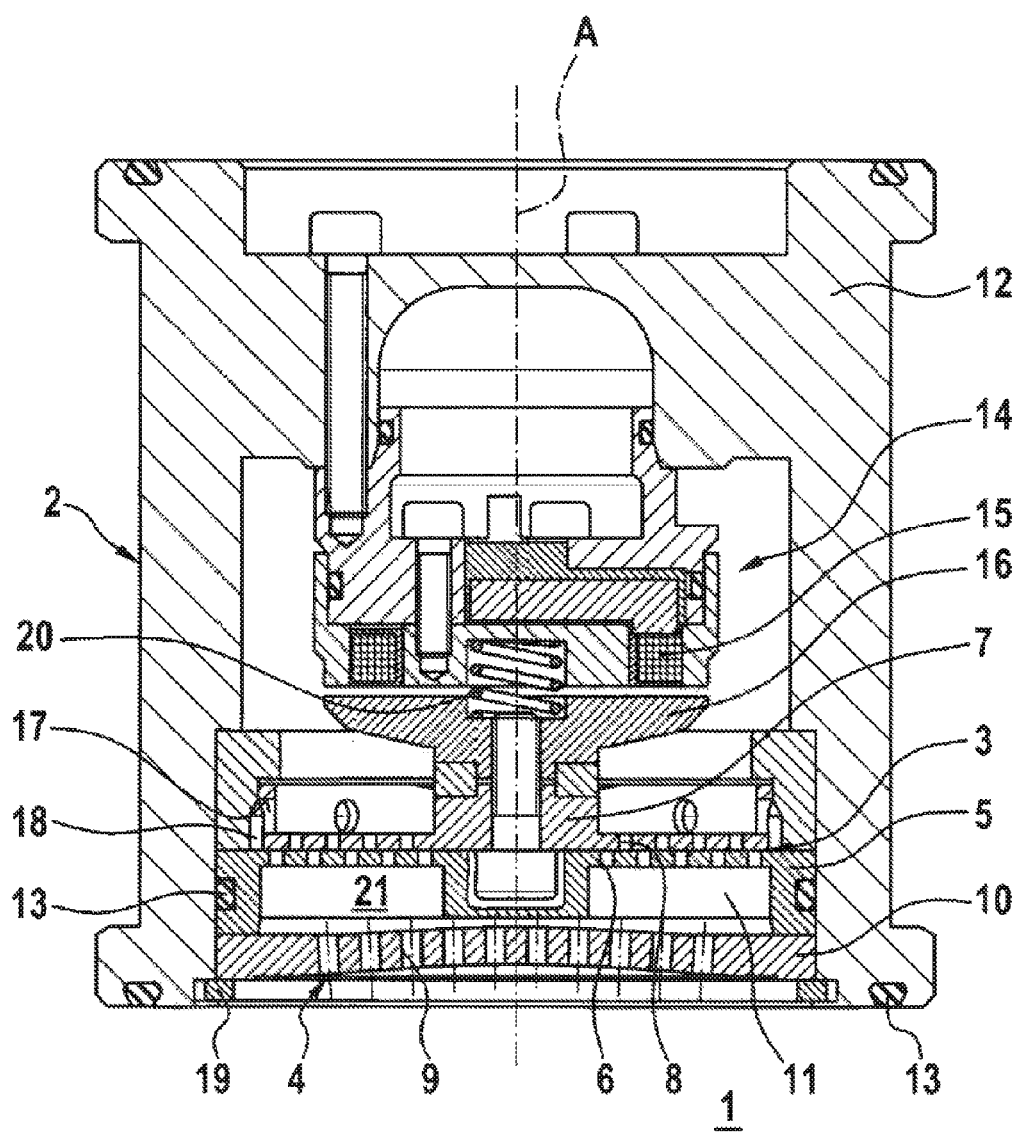
FIG. 2 shows a longitudinal section through a device according to the invention according to a second preferred embodiment.
Figure 3:
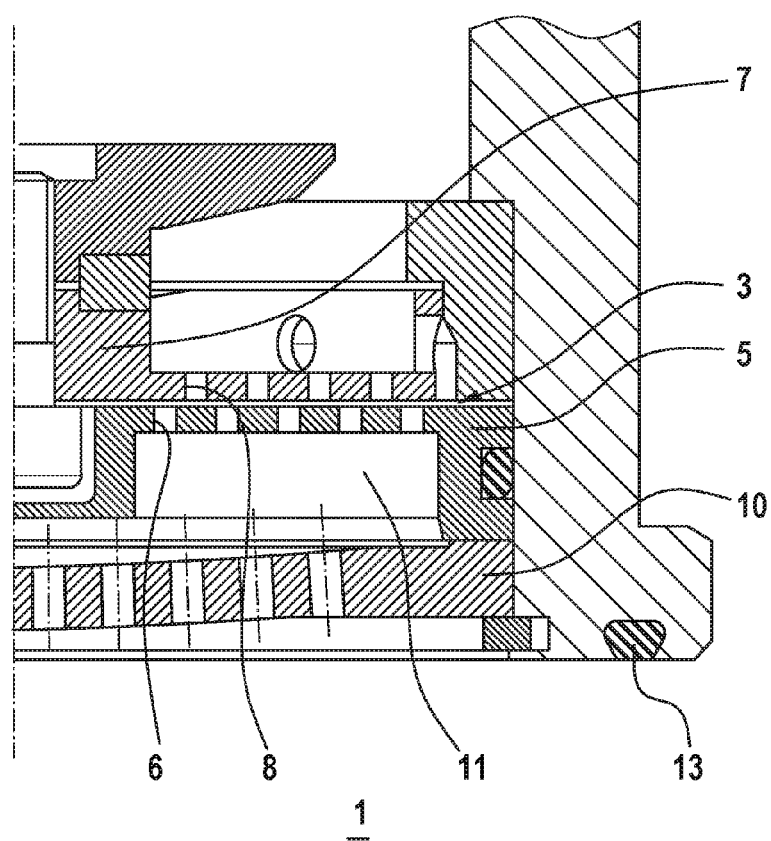
FIG. 3 shows an enlarged portion of FIG. 1.

The devices illustrated in FIGS. 1 and 2 each comprise a housing 12 into which there is inserted a gas valve 2. By way of the housing 12, the gas valve 2 can be mounted axially on an intake tract 1, wherein sealing is performed by means of a sealing ring 13 inserted into the housing 12.

The gas valve 2 accommodated in the housing 12 comprises—both in the exemplary embodiment of FIG. 1 and also in the exemplary embodiment of FIG. 2—a valve plate 5 with multiple throughflow openings 6 that can be opened up or closed off by means of a valve disk 7 that can perform a stroke movement. Here, that face surface of the valve plate 5 which faces toward the valve disk 7 interacts, as a flat seat, with the valve disk 7. To increase the throughflow of a gaseous medium through the valve plate 5, the valve disk 7 has multiple throughflow openings 8 which are arranged offset with respect to the throughflow openings 6 of the valve plate 5. The offset arrangement ensures sealing closure of the gas valve 2. When the valve is in the open position, the gaseous medium flows initially through the throughflow openings 8 of the valve disk 7. The gaseous medium is subsequently diverted twice, wherein it flows through between the valve disk 7 and the valve plate 5. The maximum flow cross section between the valve disk 7 and the valve plate 5 is in this case defined by the maximum stroke of the valve disk 7. Said maximum stroke is in the present case selected such that a first throttling point 3 is formed between the valve disk 7 and the valve plate 5. The throttling point 3 yields a pressure drop and simultaneously an increase in the flow speed of the gaseous medium before it arrives at the throughflow openings 6 of the valve plate 5. When it flows through the valve plate 5, the gaseous medium passes into a chamber 11 which is delimited, further downstream, by a plate-shaped component 10 of the gas valve 2. The plate-shaped component 10 has multiple throughflow openings 9 which form throttling points 4, positioned in parallel, downstream of the throttling point 3.

In the exemplary embodiment of FIG. 1, the plate-shaped component 10 is formed so as to be curved convexly in the flow direction. In this case, the curved profile follows a pitch circle. The multiple throughflow openings 9 have longitudinal axes which are inclined differently relative to a longitudinal axis A of the gas valve 2, wherein the longitudinal axes of the throughflow openings 9 intersect at a point. Said point coincides with the central point of the pitch circle that describes the curved profile of the plate-shaped component 10. The gaseous medium flowing through the throughflow openings 9 of the plate-shaped component 10 is in this way injected into the intake tract 1 in the form of a widening cone. This leads to a uniform distribution of the gaseous medium in the intake tract 1. This is also assisted by the fact that the throughflow openings 9 of the plate-shaped component 10 are arranged in regular fashion, that is to say at uniform intervals, and have identical flow cross sections.

In the exemplary embodiment of FIG. 2, the plate-shaped component 10 is formed so as to be curved concavely in the flow direction. The curved profile again follows a pitch circle. The multiple throughflow openings 9 have longitudinal axes which are inclined differently relative to a longitudinal axis A of the gas valve 2, wherein the longitudinal axes of the throughflow openings 9 intersect at a point, which in the present case coincides with the central point of the pitch circle that describes the curved profile of the plate-shaped component 10. The gaseous medium flowing through the throughflow openings 9 of the plate-shaped component 10 is in this way injected into the intake tract 1 in the form of a narrowing cone. This leads to a concentration of the gaseous medium in the center of the intake tract 1. This is likewise assisted by the fact that the throughflow openings 9 of the plate-shaped component 10 are arranged in regular fashion, that is to say at uniform intervals, and have identical flow cross sections.

It is accordingly possible, by means of the plate-shaped component 10 of the gas valve 2, for the gaseous medium to be distributed in targeted fashion when it is injected into the intake tract 1. Here, it is also possible to realize an asymmetrical distribution over the cross section of the intake tract 1 if the longitudinal axes of the throughflow openings 9 of the plate-shaped component 10 are oriented correspondingly and/or the throughflow openings 9—by contrast to the exemplary embodiments of FIGS. 1 and 2—are not arranged in regular fashion.

The devices illustrated in FIGS. 1 and 2 each have a magnet actuator 14 for actuating the gas valve 2. The magnet actuator 14 is in each case accommodated in a housing 12 and comprises a magnet coil 15. When the magnet coil 15 is energized, an armature 16 that is connected to the valve disk 7 is pulled in the direction of the magnet coil 15, such that the valve disk 7 is lifted from the valve plate 5 and the gas valve 2 opens. The gaseous medium, which passes into a valve chamber 21 via multiple radial bores 17 formed in the valve disk 7, flows through the valve disk 7 and through the valve plate 5. The flow of the gaseous medium to the radial bores 17 is realized via an annular chamber 18 surrounding the valve disk 7.

For the closure of the gas valve 2, the energization of the magnet coil 15 is ended, such that the spring force of a spring 20, which is supported at one side on the housing and at the other side on the armature 16, moves the armature 16 including the valve disk 7 back into the respective initial position.

The valve plate 5 is inserted into the housing 12 in such a way as to bear against the housing 12 under radial preload. The radial preload is in the present case realized by means of a sealing ring 13 which simultaneously serves for sealing purposes. The plate-shaped component 10 is mounted in front of the valve plate 5, that is to say is situated downstream of the valve plate 5. The plate-shaped component 10 is fixed in its axial position by means of a circlip 19. The plate-shaped component 10 is thus fixedly connected to the gas valve 2.

What is claimed is:

1. A method for injecting a gaseous medium into an intake tract of a gas engine or diesel-gas engine using an electromagnetically actuable gas valve, wherein the gas valve has a valve plate with at least one throughflow opening that can be opened up or closed off by means of a stroke of a valve disk that can perform a stroke movement, wherein, downstream of the throughflow opening, at least one throttling point is integrated into a flow path of the gaseous medium in order to increase flow speed of the gaseous medium, wherein, in order to increase flow speed, the gaseous medium is injected into the intake tract via at least two throttling points positioned in series, wherein flow cross sections of the throttling points are coordinated with one another, wherein the flow cross section of a downstream throttling point is smaller than the flow cross section of a throttling point situated upstream thereof, and wherein the valve disk has at least one throughflow opening which is arranged offset with respect to the at least one throughflow opening of the valve plate.

2. The method according to claim 1, wherein the at least one further, downstream throttling point is used for diverting the flow of the gaseous medium, as it is injected into the intake tract, by throughflow openings.

3. A device for injecting a gaseous medium into an intake tract of a gas engine or diesel-gas engine, comprising an electromagnetically actuable gas valve which has a valve plate with at least one throughflow opening that can be opened up or closed off by means of a stroke of a valve disk that can perform a stroke movement, wherein, downstream of the throughflow opening, at least one throttling point is integrated into a flow path of the gaseous medium in order to increase flow speed of the gaseous medium, wherein the at least one throttling point has positioned upstream thereof an upstream throttling point, which is formed, in a manner dependent on the stroke of the valve disk, between the valve disk and the valve plate when the gas valve is in an open position, wherein the upstream throttling point has a flow cross section which is larger than a flow cross section of the at least one throttling point arranged downstream, and wherein the valve disk has at least one throughflow opening which is arranged offset with respect to the at least one throughflow opening of the valve plate.

4. The device according to claim 3, wherein the at least one throttling point is a throughflow opening in a plate-shaped component.

5. The device according to claim 4, wherein the plate-shaped component and the valve plate together delimit a chamber via which the throttling points are fluidically connected.

6. The device according to claim 4, wherein the plate-shaped component is of convex or concave form.

7. The device according to claim 6, wherein at least two throughflow openings of the plate-shaped component have longitudinal axes inclined differently relative to a longitudinal axis of the gas valve.

8. The device according to claim 4, wherein at least two throughflow openings of the plate-shaped component have longitudinal axes inclined differently relative to a longitudinal axis of the gas valve.

9. The device according to claim 3, wherein the plate-shaped component is of convex form.

10. The device according to claim 3, wherein the plate-shaped component is of concave form.

* * * * *